United States Patent
East et al.

[11] 3,712,153
[45] Jan. 23, 1973

[54] INCREMENTAL GEAR DRIVE

[75] Inventors: Frank George East; Frank Rouget Bichard, both of Toronto, Ontario, Canada

[73] Assignee: Combined Engineered Products Limited, Toronto, Ontario, Canada

[22] Filed: Dec. 28, 1970

[21] Appl. No.: 97,414

[30] Foreign Application Priority Data

Jan. 7, 1970  Great Britain..........................717/70

[52] U.S. Cl. ..........................74/687, 74/675, 74/681
[51] Int. Cl. ..........................F16h 47/04, F16h 37/08
[58] Field of Search..................74/675, 687, 681, 689

[56] References Cited

UNITED STATES PATENTS

| | | | |
|---|---|---|---|
| 3,489,035 | 1/1970 | Giles | 74/687 |
| 2,908,189 | 10/1959 | Parker et al. | 74/675 |
| 1,621,915 | 3/1927 | Weston | 74/675 X |
| 2,675,716 | 4/1954 | Harlow et al. | 74/675 |
| 2,772,580 | 12/1956 | Miura et al. | 74/675 |
| 3,298,250 | 1/1967 | Moss et al. | 74/675 |
| 3,405,573 | 10/1968 | Takekawa | 74/687 |
| 3,424,030 | 1/1969 | Mennit | 74/675 |

*Primary Examiner*—Milton Kaufman
*Assistant Examiner*—Thomas C. Perry
*Attorney*—Meybee & Legris

[57] ABSTRACT

An incremental gear drive comprises input and output shafts journalled for rotation about a common axis, the shafts being drivingly connected through a multiple reduction gear train in a rotatable housing, the gears of which are caused to rotate at a controlled speed either the same as the housing or different therefrom to effect a controlled difference of speed between the input and output shafts. The unit includes a control shaft which is driven by a control motor, connected to the first pinion of the gear train.

7 Claims, 5 Drawing Figures

PATENTED JAN 23 1973　　3,712,153

INVENTORS.
FRANK GEORGE EAST
FRANK ROUGET BICHARD

BY *Maybee & Legris*

ATTORNEYS

INVENTORS.
FRANK GEORGE EAST
FRANK ROUGET BICHARD

BY *Maybee & Legris*

ATTORNEYS

INCREMENTAL GEAR DRIVE

This invention relates to incremental gear drives that is to say gear transmission which permit two shafts to be driven from a common power source with a controlled variable difference in speed between the shafts. Incremental gear drives are commonly used in stretch flattening mills and similar applications.

After metal strip has been rolled to a required thickness it requires flattening. Out-of-flatness may consist of waviness at the edges or bulging in the middle of the strip. This latter condition is commonly known in the trade as "oil canning."

One of the most successful methods of correcting the out-of-flatness or rolled metal strip is by continuously stretching the strip by an amount which subjects the material of the strip to a stress somewhat more than the elastic limit or yield point but below a stress that would exceed the ultimate strength of the material and cause rupture of the strip. In this method the strip is unwound from a pay-off reel by passing it around a series of positively driven rolls, and is caused to stretch by passing it over another series of positively driven rolls running at a controlled higher speed, whereby the strip is stretched and then rewound on a take-up reel. Tension is applied at the pay-off and take-up reels to create enough friction between the rolls and the strip to prevent slippage.

With this flattening method the power input from the drive motor need only be sufficient to overcome friction and to supply the power equivalent of the strip tension at the speed difference between the pay-off and take-up reels. However any unit which transmits this tension at the strip speed (rather than merely at said speed difference) must be designed to handle a high horsepower, normally 8 to 10 times the power input from the driving motor.

Conventional gear drives used in the above flattening method consist of a differential unit having bevel gears in a carrier, incremental speeds being obtained by rotating the carrier. Such a unit must be quite large, and the gear tooth velocity (the velocity at the mesh of the bevel gears) is high. In some cases extremely high grade expensive ground spiral bevel gears have been required at the gear tooth velocity demanded, and in the future the requisite velocity may be beyond the capabilities of available spiral bevel gears.

The present invention provides a device whereby difference in speeds between two shafts can be accomplished by driving the shafts from a common drive motor, one of the shafts being driven through a train of gears which are so arranged that at a base or synchronous speed, at which the shafts rotate at the same speed, the gears of the train do not rotate around their respective axes. The gears rotate around their axes only to provide a difference in speed between the shafts. The gear tooth velocity being dependent upon only the speed differential required, rather than upon the base or synchronous speed, the resulting maximum gear tooth velocity can be of the order of only 10 percent of the gear tooth velocity in the conventional arrangement mentioned above.

Accordingly, the present invention provides an incremental gear drive comprising an input shaft, an output shaft, said shafts being journalled for rotation about a common axis, a central gear rigidly connected to one of the shafts for rotation therewith, a rotatable housing rigidly connected to the other of said shafts for rotation therewith, multiple countershaft gears journalled in the rotatable housing and meshing with the central gear, and variable speed drive means drivingly connected with the multiple countershaft gears whereby to provide a controlled variable difference of speed between the input and output shafts. Preferably one of the shafts is hollow and the other extends into the hollow shaft so that the power output can be taken from the same end of the incremental drive unit as the power input to it, the control motor being located at the opposite end and the rotatable housing being coaxial with the shafts between said ends.

Preferred embodiments of the invention are illustrated by way of example in the accompanying drawings, in which.

Figure 1:
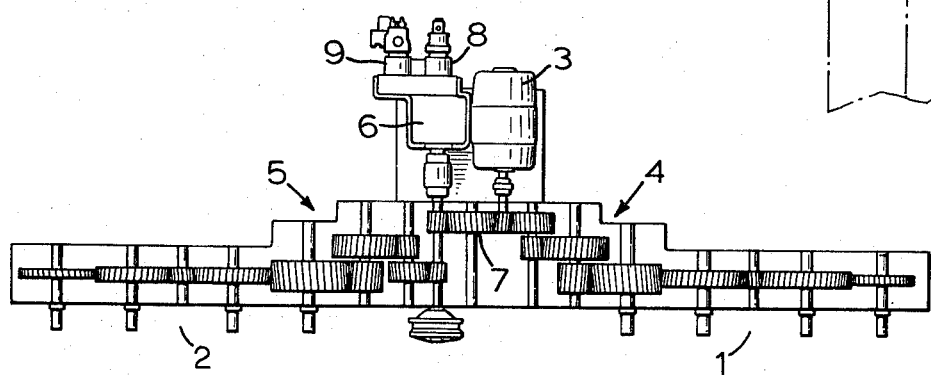
FIG. 1 is a diagrammatic plan view of a stretch flattening mill drive incorporating the incremental gear drive of the invention.

Referring to FIG. 1, a metal strip stretch flattening mill has a first set of rolls coupled to shaft extensions 1 and a second set of rolls coupled to shaft extensions 2, which are driven at controllably different speeds from a common drive motor 3 through respective reduction gear trains 4,5. The motor 3 has a variable speed output shaft so the basic speed of the strip to be flattened can be varied. The difference of speeds between the two sets of rolls is controlled by means of an incremental gear unit 6. The incremental gear unit 6 has an input shaft which is driven from the drive motor 3 through a gear train 7, and an output shaft which is connected to the reduction gear train 5 and driven at a speed which differs from the speed of the input shaft in accordance with the speed of a control motor 8. The control motor 8 may be a hydraulic motor supplied by a hydraulic pump 9, the output of which is made dependent upon the speed of the drive motor 3 as hereinafter described. A web of metal strip travelling between the rolls connected to shaft extensions 1 and 2 is stretched to a degree dependent upon the difference in speed between the rolls driven by shafts 1 and 2. The strip must travel in the direction from the rolls rotating at the lower speed to the rolls rotating at the higher speed.

Figure 2:
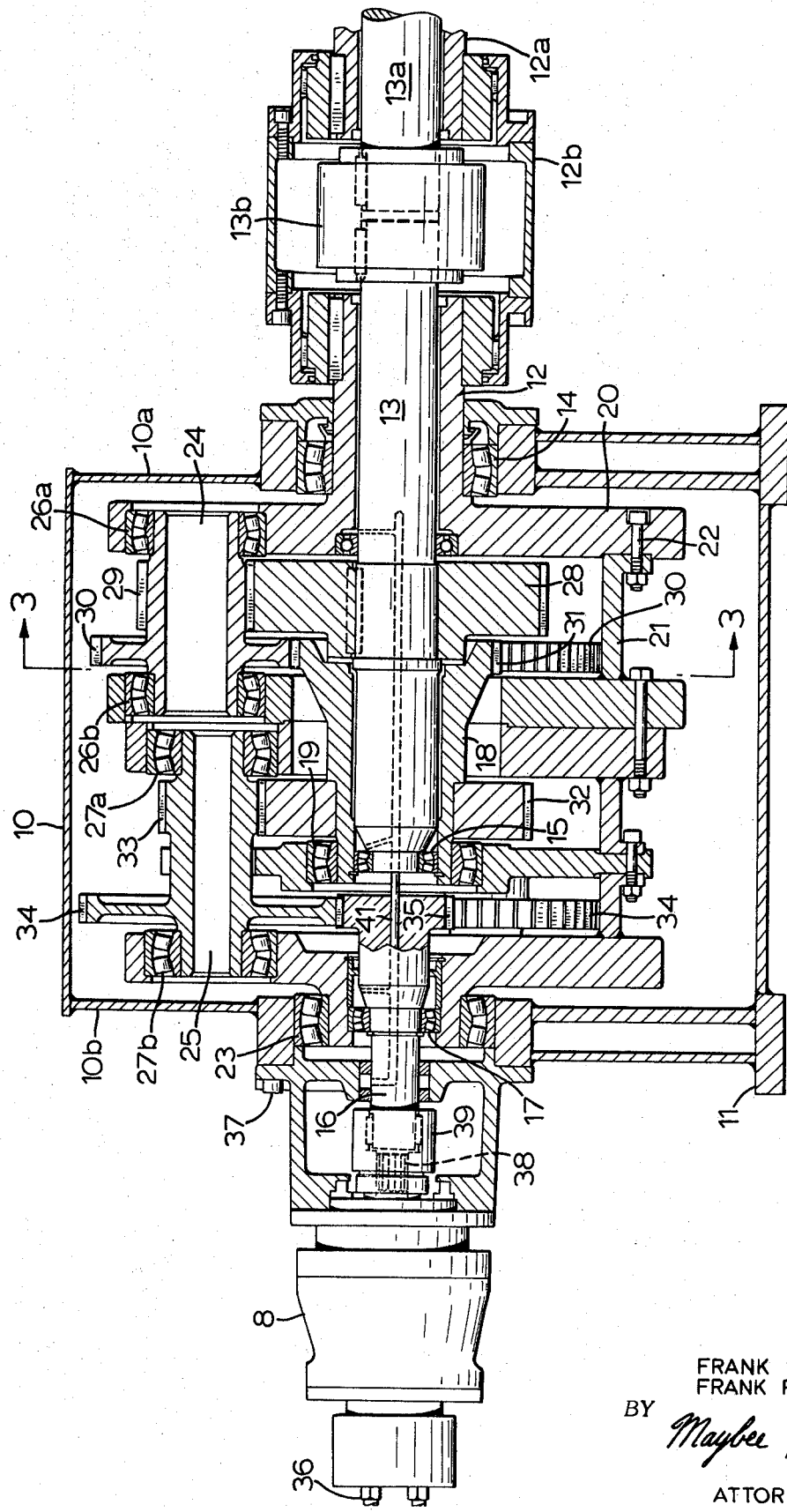
FIG. 2 shows a longitudinal vertical section taken through the axis of the incremental gear drive.
Figure 3:
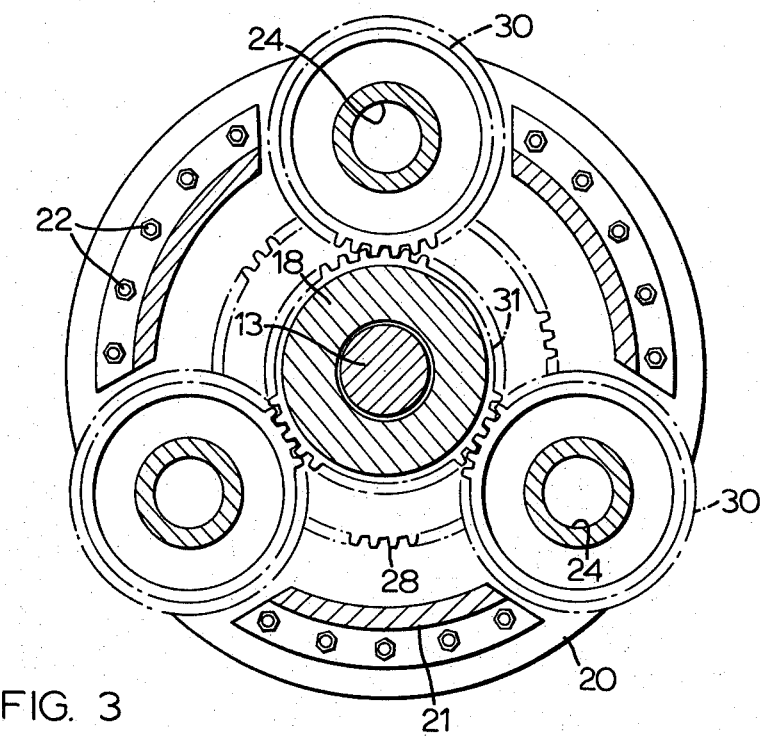
FIG. 3 is a section on line 3—3 in FIG. 2.

The incremental gear unit 6 is illustrated in greater detail in FIGS. 2 and 3. The unit comprises a stationary housing or frame 10 having a pair of opposite end faces 10a, 10b, the housing or frame being rigidly mounted on a base 11. An input shaft 12 and an output shaft 13 are journalled in the housing 10 for rotation about a common axis, the input shaft 12 being supported in a bearing 14 and the output shaft 13 being supported in bearings 15 and 15a. The input shaft 12 is constructed as a hollow sleeve along which the output shaft extends axially, the two shafts extending from the one end face 10a of the housing 10. The input and output shafts are connected to respective shaft extensions 12a, 13a by means of shaft couplings 12b, 13b.

Also journalled in the housing 10 and extending from the end face 10b thereof is a control shaft 16, the control shaft 16 being coaxial with the shafts 12 and 13 and supported by a bearing 17. A hollow intermediate shaft 18, into which the output shaft 13 extends, is supported at one end by a bearing 19, this shaft being coaxial with the other three shafts and journalled for rotation about said common axis. The inner end of the input shaft 12 is constructed as a flange 20, to which one end of a rotatable housing assembly 21 is rigidly bolted by bolts 22, the other end of the rotatable housing assembly being supported by a bearing 23 mounted in the end face 10b of the stationary housing. The rotatable housing assembly 21 carries a first set of countershafts 24, and a second set of countershafts 25, there being three countershafts in each set which are equally spaced around said common axis. As illustrated in FIG. 2, the countershafts 24 are journalled in bearings 26a, 26b, and the countershafts 25 are journalled in bearings 27a, 27b.

The rotatable housing assembly is not normally immersed in oil, oil passages 41 being provided for leading oil from an outside source to the various bearings and gear meshes.

Keyed or otherwise rigidly connected to the output shaft 13 for rotation therewith is a central gear, or first externally toothed sun gear 28, which meshes with a first set of countershaft gears or pinions 29 that are rotatable with the countershafts 24.

Clearly, as the motor driven input shaft 12 is rotated, power will be transmitted to the output shaft 13 through the rotatable housing 21, gears 29, and central gear 28. Any difference of speed between the input and output shafts is determined by the speed of rotation of the gears 29, which speed is variably controlled from the control motor 8 through reduction gearing that will now be described.

Rotatable with each of the countershaft gears 29 and carried by the countershaft 24 is a countershaft third gear 30, this second set of three countershaft gears 30 meshing with a second externally toothed sun gear 31 on the intermediate shaft 18. The intermediate shaft, which is supported at one end by the bearing 19, is thus also supported at its other end by engagement with the gears 30. A third externally toothed sun gear 32, rotatable with the sun gear 31, is keyed or otherwise rigidly connected to the intermediate shaft, and this meshes with a third set of three pinions, or countershaft gears 33 carried by the countershafts 25. A fourth set of countershaft gears 34 carried by the countershafts 25 are rotatable with the corresponding gears 33, each of the countershaft gears 34 meshes with a pinion, or fourth externally toothed sun gear 35, which is rotatable with the control shaft 16.

The control motor 8, which is shown as a hydraulic motor 8 having fluid connections 36, is bolted by bolts 37 to the end face 10b of the stationary housing. This control motor has an output shaft 38 connected by a coupling 39 to the control shaft 16.

When the control shaft 16 is rotated at the same speed as the input shaft 12, and hence at the speed of the rotary housing assembly 21, there can be no rotation of the planet gears 29 about their individual axes, since there is no relative rotation between the control shaft and the rotatable housing assembly. The central gear 28 is therefore locked to the rotating housing assembly and so the speed of the output shaft 13 will be the same as the speed of the input shaft 12. However, when the control shaft 16 is rotated by the control motor at a speed which is different from the speed of the input shaft, the consequent rotation of the reduction gearing within the rotatable housing assembly will cause the gears 29 to rotate at a speed determined by the difference speed, and hence will cause the output shaft speed to be greater or less than the input shaft speed, the difference in speed being determined, of course, by the speed of the control shaft.

Figure 4:
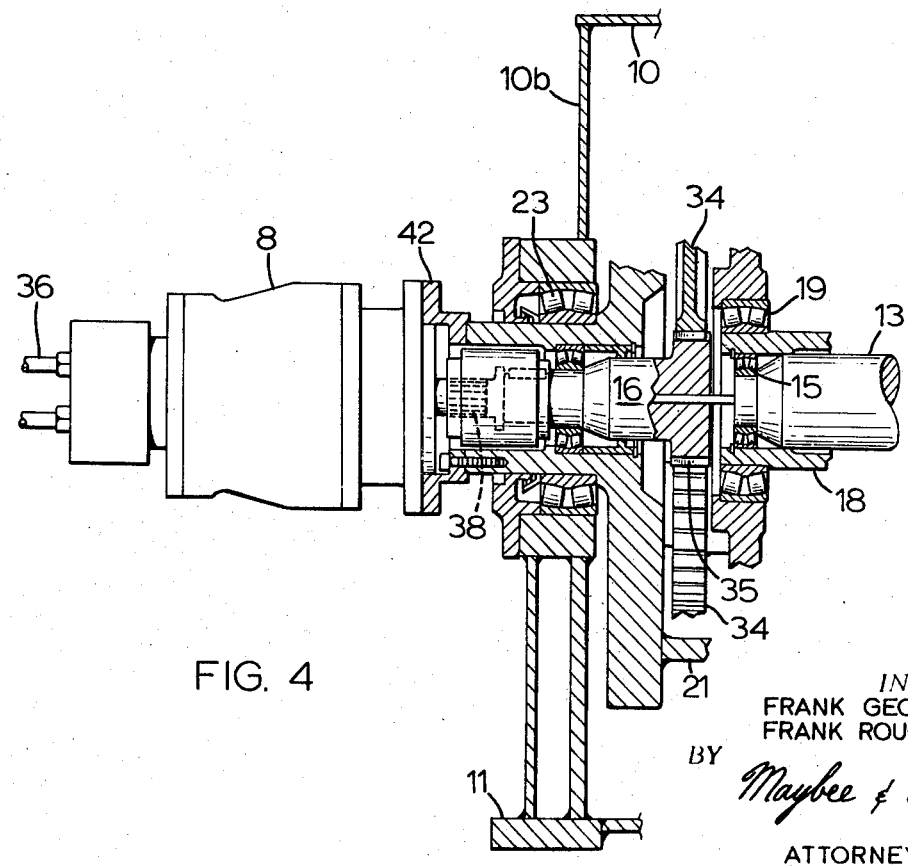
FIG. 4 shows in section a detail of a modification of the incremental gear drive.

FIG. 4 shows a detail of a modification of the unit described above. In this figure the same reference numerals are used to denote elements corresponding to elements shown in FIG. 2. The modified unit differs from the unit of FIG. 2 in this respect, that the motor 8 is bolted to a flange 42 on the rotatable housing 21, so that it rotates bodily with the rotatable housing at the speed of the input shaft. Therefore, when the control motor 8 is not energized there will be no relative rotation between the control shaft 16 and the rotatable housing assembly 21, and so the gears 29 will not rotate about their own axes, the output shaft 13 will therefore be locked to the input shaft. When the control motor 8 is energized so that its output shaft rotates relative to the motor casing, a difference speed is transmitted to the gears 29 and so the output shaft will rotate faster or slower than the input shaft by an amount determined by such difference speed.

Figure 5:
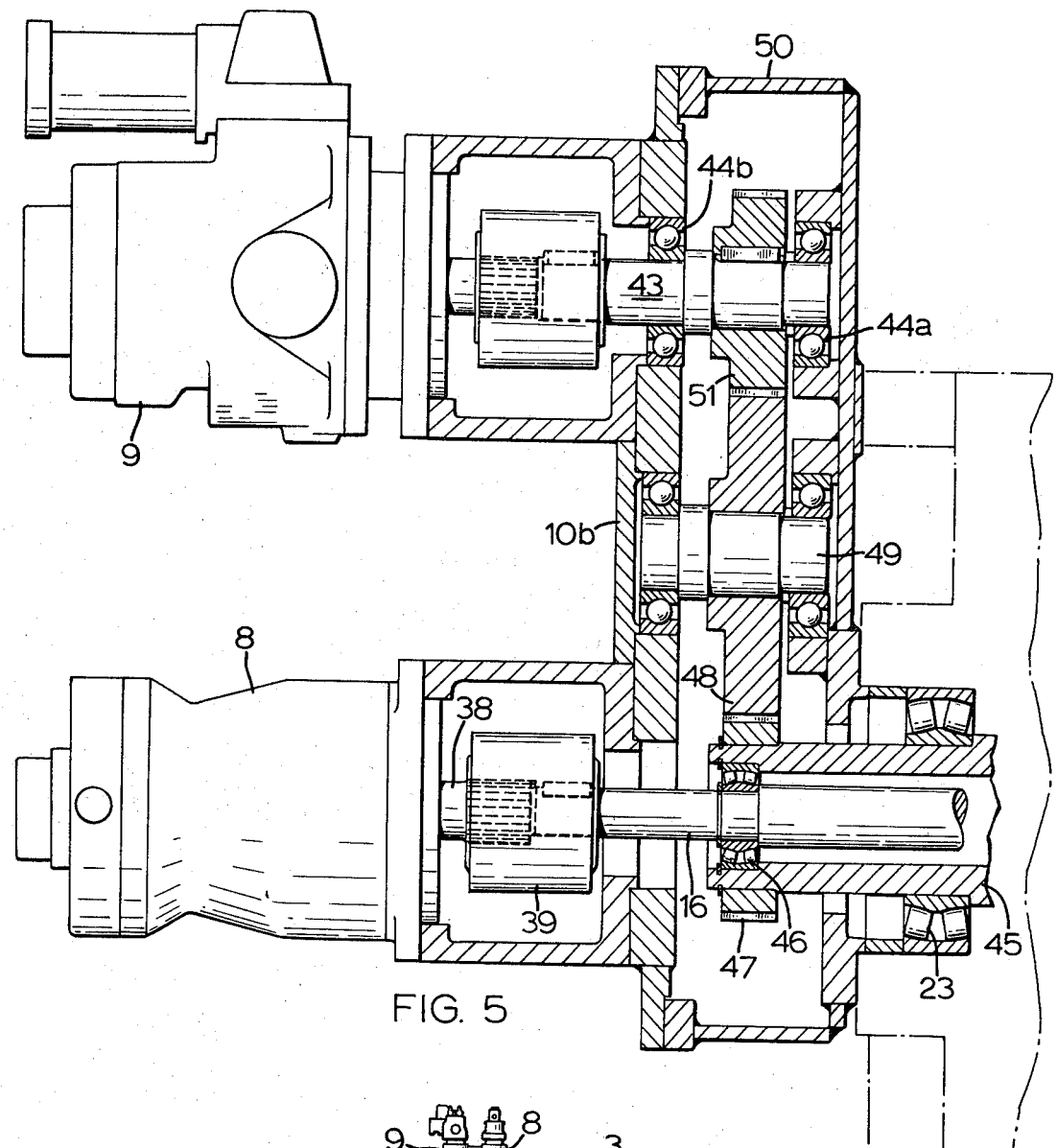
FIG. 5 shows in section a detail of another modification of the incremental gear drive.

FIG. 5 shows a detail of another modification, which corresponds more closely to the diagrammatic representation in FIG. 1. In this modification, the stationary housing 10 is formed with an extension 50 in which an auxiliary shaft 43 is journalled. The auxiliary shaft 43 is supported by bearings 44a, 44b and extends parallel to the input shafts axis, which is of course also the axis of the control shaft 16. The auxiliary output shaft extends from an extension of the end face 10b of the stationary housing. A tubular sleeve 45 extending from the rotatable housing assembly (not shown) and rotatable therewith, supports the control shaft 16 coaxially by a bearing 46.

Keyed to the outer surface of the tubular sleeve 45 is a gear 47 which meshes with a gear 48 on a countershaft 49, the gear 48 in turn meshing with a gear 51 on the auxiliary shaft 43. In this way the auxiliary output shaft is rotated at the speed of the rotatable housing assembly, and hence at the speed of the input shaft. This is a particularly advantageous arrangement where it is necessary to maintain a constant speed ratio of the input and output shafts, rather than an absolute speed difference, for it becomes possible to energize the control motor 8 from a power unit driven from the shaft 43 at the input shaft speed, the power unit being conveniently mounted beside the control motor. In the illustrated example the control motor 8 is a hydraulic motor supplied from a hydraulic pump 9 mounted on the end face 10b. The hydraulic pump 9 is driven from the auxiliary shaft 43, its output volume being determined by the input shaft speed and the speed of the control motor being determined by this output volume.

It is to be understood that although the control motor 8 has been described throughout as a hydraulic motor, it may alternatively be a variable speed electric motor or other prime mover. Whether the motor 8 be an electric motor, a hydraulic motor or other prime mover, it may be mounted on an end face of the stationary casing as shown in FIGS. 2 and 5, or it may be mounted so as to rotate with the rotary housing assembly as shown in FIG. 4; in the latter case it is of course necessary to supply power to the motor through a rotary joint (in the case of a hydraulic motor) or through slip rings (in the case of an electric motor.)

WHAT WE CLAIM AS OUR INVENTION IS:

1. An incremental gear drive comprising:
 an input shaft and an output shaft, said shafts being journalled for rotation about a common axis,
 a first externally toothed gear rigidly connected to one of said shafts for rotation therewith,
 a rotatable housing rigidly connected to the other one of said shafts for rotation therewith,
 an intermediate shaft journalled for rotation about said common axis,
 a control shaft,
 a first double speed reduction gear train for transmitting torque from the intermediate shaft to said one shaft, said first double speed reduction gear train comprising:
  a. a first set of countershaft gears journalled in said housing and meshing with the first externally toothed gear,
  b. a second externally toothed gear rigidly connected to the intermediate shaft for rotation therewith, and
  c. a second set of countershaft gears rotatable with the first set of countershaft gears and meshing with said second externally toothed gear;
 a second double speed reduction gear train for transmitting torque from the control shaft to the intermediate shaft, said second double speed reduction gear train comprising:
  a. a third externally toothed gear rigidly connected to the intermediate shaft for rotation therewith,
  b. a fourth externally toothed gear rigidly connected to the control shaft for rotation therewith,
  c. a third set of countershaft gears journalled in the housing and meshing with the third externally toothed gear, and
  d. a fourth set of countershaft gears rotatable with the third set of countershaft gears and meshing with the fourth externally toothed gear;
 and variable speed drive means connected to the control shaft whereby to produce a controlled variable difference of speed between said input and output shafts.

2. An incremental gear drive according to claim 1, wherein the control shaft is journalled for rotation about said common axis.

3. An incremental gear drive according to claim 2 wherein one of said input and output shafts is a hollow sleeve, the other of said input and output shafts extending along the hollow sleeve.

4. An incremental gear drive according to claim 3, wherein the variable speed drive means comprises a motor having a casing which is rigidly connected to the input shaft for rotation therewith.

5. An incremental gear drive according to claim 3, wherein the variable speed drive means is a hydraulic motor.

6. An incremental gear drive according to claim 5, including an auxiliary shaft journalled for rotation about an axis which is parallel to and spaced from said common axis, a gear train operatively connecting the auxiliary shaft with said input shaft, and a hydraulic pump for supplying the motor, the hydraulic pump being driven from said auxiliary shaft.

7. An incremental gear drive according to claim 6, further comprising a stationary housing wherein said input and output shafts, and said intermediate, control and auxiliary shafts are journalled, the input and output shafts extending from one end of the stationary housing, the auxiliary shaft and the control shaft extending from the other end of the stationary housing, and the hydraulic pump and motor being mounted on said other end of the stationary housing and operatively connected to said auxiliary shaft and control shaft respectively.

* * * * *